(12) United States Patent
Connell, II et al.

(10) Patent No.: US 8,280,763 B2
(45) Date of Patent: Oct. 2, 2012

(54) CUSTOMER REWARDING

(76) Inventors: Jonathan H. Connell, II, Cortlandt-Manor, NY (US); Myron D. Flickner, San Jose, CA (US); Norman Haas, Mount Kisco, NY (US); Arun Hampapur, Norwalk, CT (US); Sharathchandra U. Pankanti, Norwalk, CT (US)

(*) Notice: Subject to any disclaimer, the term of this patent is extended or adjusted under 35 U.S.C. 154(b) by 428 days.

(21) Appl. No.: 12/037,270

(22) Filed: Feb. 26, 2008

(65) Prior Publication Data
US 2009/0216632 A1    Aug. 27, 2009

(51) Int. Cl.
G06Q 30/00    (2012.01)
(52) U.S. Cl. .................... 705/14.1; 705/14.38
(58) Field of Classification Search ............ 705/14, 705/35, 14.38
See application file for complete search history.

(56) References Cited

U.S. PATENT DOCUMENTS

| | | |
|---|---|---|
| 4,323,772 A | 4/1982 | Serge |
| 5,331,455 A | 7/1994 | Chang |
| 5,426,282 A | 6/1995 | Humble |
| 5,467,403 A | 11/1995 | Fishbine et al. |
| 5,477,379 A | 12/1995 | Chang |
| 5,497,314 A | 3/1996 | Novak |
| 5,513,264 A | 4/1996 | Wang et al. |
| 5,546,475 A | 8/1996 | Bolle et al. |
| 5,583,686 A | 12/1996 | Chen |
| 5,609,223 A | 3/1997 | Iizaka et al. |
| 5,631,976 A | 5/1997 | Bolle et al. |
| 5,635,697 A | 6/1997 | Shellhammer et al. |
| 5,649,970 A | 7/1997 | Connell et al. |
| 5,659,167 A | 8/1997 | Wang et al. |
| 5,763,864 A | 6/1998 | O'Hagan et al. |
| 5,811,774 A | 9/1998 | Ju et al. |
| 5,815,200 A | 9/1998 | Ju et al. |
| 5,883,968 A | 3/1999 | Welch et al. |
| 5,918,211 A | 6/1999 | Sloane |
| 6,005,959 A | 12/1999 | Mohan et al. |
| 6,032,128 A | 2/2000 | Morrison et al. |

(Continued)

FOREIGN PATENT DOCUMENTS

WO    0225506    3/2002

OTHER PUBLICATIONS

Seema Mehta, "Delta adds fee to tickets not bought online." (Los Angeles Times, Jan. 14, 1999) pp. 1-2.*

(Continued)

*Primary Examiner* — William Rankins
(74) *Attorney, Agent, or Firm* — Hoffman Warnick LLC

(57) ABSTRACT

The present invention provides an approach for rewarding customers for use of self-checkout stations and, optionally, for being self-sufficient in such use by not requiring retailer (employee) assistance. Specifically, the under the present invention, a set of service choices made by a customer during purchasing transactions are tracked. Such service choices include whether the customer elected to use self-checkout stations. In addition, a frequency of assistance needed by the customer during the purchasing transactions will be tracked. Such tracking can be accomplished using any known technology including the use of the customer loyalty cards that are assigned to specific customers. In any event, a reward can be offered to the customer if the customer elected to use self-checkout stations to complete at least a subset of the purchasing transactions, and/or if the frequency of assistance needed by the customer during the purchasing transactions fell below a predetermined threshold.

25 Claims, 2 Drawing Sheets

U.S. PATENT DOCUMENTS

| | | | |
|---|---|---|---|
| 6,064,469 A | 5/2000 | Brownstein | |
| 6,122,409 A | 9/2000 | Boggs et al. | |
| 6,287,299 B1 | 9/2001 | Sasnett et al. | |
| 6,310,964 B1 | 10/2001 | Mohan et al. | |
| 6,366,696 B1 | 4/2002 | Hertz et al. | |
| 6,382,357 B1 | 5/2002 | Morrison et al. | |
| 6,434,530 B1 | 8/2002 | Sloane et al. | |
| 6,457,644 B1 | 10/2002 | Collins, Jr. et al. | |
| 6,504,481 B2 | 1/2003 | Teller | |
| 6,556,276 B2 | 4/2003 | Staeheli et al. | |
| 6,606,171 B1 | 8/2003 | Renk et al. | |
| 6,726,094 B1 | 4/2004 | Rantze et al. | |
| 6,853,400 B1 | 2/2005 | Matama | |
| 6,991,158 B2 | 1/2006 | Munte | |
| 7,044,370 B2 | 5/2006 | Bellis et al. | |
| 7,118,026 B2 | 10/2006 | Harris et al. | |
| 7,124,058 B2 | 10/2006 | Namaky et al. | |
| 7,143,065 B1* | 11/2006 | Enright | 705/43 |
| 7,159,770 B2 | 1/2007 | Onozu | |
| 7,168,618 B2 | 1/2007 | Schwartz | |
| 7,196,624 B2 | 3/2007 | Teller | |
| 7,202,780 B2 | 4/2007 | Teller | |
| 7,334,729 B2 | 2/2008 | Brewington | |
| 7,337,960 B2 | 3/2008 | Ostrowski et al. | |
| 7,422,147 B2 | 9/2008 | Rosenbaum | |
| 2001/0045463 A1 | 11/2001 | Madding et al. | |
| 2002/0004404 A1 | 1/2002 | Squibbs | |
| 2002/0013837 A1 | 1/2002 | Battat et al. | |
| 2002/0070861 A1 | 6/2002 | Teller | |
| 2002/0110374 A1 | 8/2002 | Staeheli et al. | |
| 2002/0121547 A1 | 9/2002 | Wieth et al. | |
| 2002/0161658 A1 | 10/2002 | Sussman | |
| 2002/0194074 A1 | 12/2002 | Jacobs | |
| 2003/0024982 A1 | 2/2003 | Bellis, Jr. et al. | |
| 2003/0071725 A1 | 4/2003 | Teller | |
| 2003/0167242 A1 | 9/2003 | Hamilton | |
| 2004/0125396 A1 | 7/2004 | Burke | |
| 2004/0262391 A1 | 12/2004 | Harris et al. | |
| 2005/0096855 A1 | 5/2005 | Teller | |
| 2005/0173527 A1 | 8/2005 | Conzola | |
| 2005/0189411 A1 | 9/2005 | Ostrowski et al. | |
| 2005/0189412 A1 | 9/2005 | Hudnut et al. | |
| 2005/0200490 A1 | 9/2005 | Teller | |
| 2005/0211771 A1 | 9/2005 | Onozu | |
| 2005/0237213 A1 | 10/2005 | Teller | |
| 2005/0240478 A1* | 10/2005 | Lubow et al. | 705/14 |
| 2006/0010033 A1* | 1/2006 | Thomas | 705/14 |
| 2006/0032915 A1 | 2/2006 | Schwartz | |
| 2006/0047835 A1 | 3/2006 | Greaux | |
| 2006/0161390 A1 | 7/2006 | Namaky et al. | |
| 2006/0179164 A1 | 8/2006 | Katibian et al. | |
| 2006/0180664 A1* | 8/2006 | Barrett et al. | 235/383 |
| 2006/0288133 A1 | 12/2006 | Katibian et al. | |
| 2006/0289637 A1 | 12/2006 | Brice et al. | |
| 2006/0290980 A1 | 12/2006 | Terada | |
| 2007/0094080 A1* | 4/2007 | Wiken | 705/14 |
| 2007/0107016 A1 | 5/2007 | Angel et al. | |
| 2007/0107017 A1 | 5/2007 | Angel et al. | |
| 2007/0107021 A1 | 5/2007 | Angel et al. | |
| 2007/0279244 A1 | 12/2007 | Haughawout et al. | |
| 2007/0288310 A1* | 12/2007 | Boos et al. | 705/14 |
| 2008/0027796 A1 | 1/2008 | Chaves | |
| 2008/0059281 A1 | 3/2008 | Tower et al. | |
| 2008/0141755 A1 | 6/2008 | Edwards | |
| 2008/0142598 A1 | 6/2008 | Kwan | |
| 2008/0149725 A1 | 6/2008 | Rosenbaum | |
| 2008/0154727 A1* | 6/2008 | Carlson | 705/14 |
| 2009/0119168 A1* | 5/2009 | Otto et al. | 705/14 |
| 2010/0042236 A1* | 2/2010 | Chow | 700/94 |
| 2011/0060634 A1* | 3/2011 | Grossman et al. | 705/14.17 |
| 2012/0030003 A1* | 2/2012 | Herwig | 705/14.38 |
| 2012/0101881 A1* | 4/2012 | Taylor et al. | 705/14.13 |

OTHER PUBLICATIONS

Bolle et al., "VeggieVision: A Produce Recognition System", pp. 1-4, IEEE Workshop on Applications of Computer Vision, WACV 1996.

Bolle et al., "VeggieVision: A Produce Recognition System", pp. 1-8, 1996.

Connell II et al., U.S. Appl. No. 11/756,391, Office Action Communication, Dec. 2, 2009, 19 pages.

Connell II et al., U.S. Appl. No. 12/052,051, Office Action Communication, Feb. 23, 2009, 13 pages.

Connell II et al., U.S. Appl. No. 12/052,051, Office Action Communication, Jan. 6, 2010, 24 pages.

Connell II et al., U.S. Appl. No. 12/052,051, Office Action Communication, Sep. 8, 2009, 19 pages.

Connell II et al., U.S. Appl. No. 12/052,051, Office Action Communication, Jun. 26, 2009, 19 pages.

Connell II et al., U.S. Appl. No. 11/782,177, Office Action Communication, Nov. 24, 2009, 16 pages.

Connell II et al., U.S. Appl. No. 11/782,173, Office Action Communication, Nov. 27, 2009, 12 pages.

Connell II et al., U.S. Appl. No. 11/782,173, Office Action Communication, May 27, 2009, 12 pages.

Sahai, "Towards Distributed and Dynamic Network Management", IEEE, 1998, 10 pages.

Reesen, "Virtual World Technologies to Manage a Grid", IBM Corporation, 2008, 19 pages.

Derwent, Web based ordering system for non-standardised goods e.g. fruit, vegetables provides view of item for selection and prints bar code on item for order processing, Jul. 10, 1998, Abstract, 2 pages.

Connell II, et al., U.S. Appl. No. 11/782,177, Final Office Action, Apr. 23, 2010, 18 pages.

Connell II, et al., U.S. Appl. No. 12/052,046, Office Action, Apr. 2, 2010, 13 pages.

Connell II, et al. U.S. Appl. No. 11/782,173, Examiner's Answer, Apr. 30, 2010, 11 pages.

Connell II, et al., U.S. Appl. No. 11/756,391, Final Office Action, May 6, 2010, 18 pages.

Connell II, U.S. Appl. No. 12/052,051, Office Action Communication, Jun. 11, 2010, 32 pages.

Crosland, U.S. Appl. No. 12/052,046, Notice of Allowance & Fees Due, Oct. 7, 2010, 14 pages.

Kim, U.S. Appl. No. 11/756,382, Office Action Communication, Sep. 29, 2010, 26 pages.

Stanford, U.S. Appl. No. 12/112,318, Office Action Communication, Nov. 8, 2010, 20 pages.

Johnson, Office Action Communication for U.S. Appl. No. 12/052,051 dated Dec. 23, 2010, 31 pages.

Vo, Office Action Communication for U.S. Appl. No. 12/037,266 dated Jan. 27, 2011, 31 pages.

Kim, Notice of Allowance and Fee(s) Due for U.S. Appl. No. 11/756,382 dated Mar. 24, 2011, 11 pages.

Stanford, U.S. Appl. No. 12/112,318, Office Action Communication, May 3, 2011, 16 pages.

Johnson, U.S. Appl. No. 12/052,051, Notice of Allowance & Fees Due, Jul. 14, 2011, 20 pages.

Vo, U.S. Appl. No. 12/037,266, Office Action Communication, Jul. 22, 2011, 18 pages.

Stanford, U.S. Appl. No. 11/782,177, Office Action Communication, Feb. 28, 2012, 31 pages.

Vo, U.S. Appl. No. 12/037,266, Office Action Communication, Mar. 9, 2012, 13 pages.

Stanford, U.S. Appl. No. 11/756,391, Office Action Communication, Mar. 12, 2012, 29 pages.

Seth, U.S. Appl. No. 12/111,652, Notice of Allowance & Fees Due, Mar. 14, 2012, 7 pages.

Stanford, U.S. Appl. No. 11/782,177, Office Action Communication, Jun. 19, 2012, 16 pages.

Vo, U.S. Appl. No. 12/037,266, Office Action Communication, Jul. 17, 2012, 14 pages.

* cited by examiner

CUSTOMER REWARDING

CROSS-REFERENCE TO RELATED APPLICATIONS

This application is related in some aspects to the commonly owned and application entitled "Smart Scanning System," filed May 31, 2007, and which is assigned U.S. patent application Ser. No. 11/756,391, the entire contents of which are herein incorporated by reference. This application is related in some aspects to the commonly owned and application entitled "Portable Device-Based Shopping Checkout," filed May 31, 2007, and which is assigned U.S. patent application Ser. No. 11/756,382, the entire contents of which are herein incorporated by reference. This application is related in some aspects to the commonly owned and application entitled "Item Scanning System," filed Jul. 24, 2007, and which is assigned U.S. patent application Ser. No. 11/782,173, the entire contents of which are herein incorporated by reference.

BACKGROUND OF THE INVENTION

Shopping checkout (e.g., retail supermarket, etc.) is a process by which most everyone is familiar. Typical checkout involves a shopper navigating about a store collecting items/items for purchase. Often the shopper will utilize a shopping receptacle such as a shopping cart and/or shopping basket. Upon completion of gathering the desired items, the shopper will proceed to a checkout station for checkout (e.g., bagging and payment). In recent years, many stores have become equipped with self-checkout stations whereby a shopper will scan and bag the items his/herself, and then make payment via the self-checkout station.

One benefit derived by retailers from the presence of self-checkout stations is the ability to reduce personnel, or redirect personnel to better serve the customers. Additionally, the customer benefits from reduced wait times derived from use of self-checkout stations. Retailers and customers alike would benefit by increasing the number of customers who take advantage of self-checkout stations. Unfortunately, there are currently no systems for granting incentives to customers for using self-checkout stations. In view of the foregoing, there exists a need for a solution that addresses at least one of the deficiencies in the related art.

SUMMARY OF THE INVENTION

In general, the present invention addresses the deficiencies in the related art by providing an approach for rewarding customers for use of self-checkout stations and, optionally, for being self-sufficient in such use by not requiring retailer (employee) assistance. Specifically, under aspects of the present invention, a set of service choices made by a customer during purchasing transactions are tracked. Such service choices include whether the customer elected to use self-checkout stations. In addition, a frequency of assistance needed by the customer during the purchasing transactions will be tracked. Such tracking can be accomplished using any known technology, including the use of customer loyalty cards that are assigned to specific customers. In any event, a reward can be offered to a customer if the customer elected to use self-checkout stations to complete at least a subset of the purchasing transactions, and/or if the frequency of assistance needed by the customer during the purchasing transactions fell below a predetermined threshold.

A first aspect of the present invention provides a customer reward method, comprising: tracking a set of service choices made by a customer during purchasing transactions; tracking a frequency of assistance needed by the customer during the purchasing transactions; and offering a reward to the customer based on at least one of the following: whether the set of service choices made by the customer included a service choice to use self-checkout stations to complete at least a subset of the purchasing transactions, or if the frequency of assistance needed by the customer during the purchasing transactions fell below a predetermined threshold.

A second aspect of the present invention provides a customer reward system, comprising: a module for tracking a set of service choices made by a customer during purchasing transactions; a module for tracking a frequency of assistance needed by the customer during the purchasing transactions; and a module for offering a reward to the customer based on at least one of the following: whether the set of service choices made by the customer included a service choice to use self-checkout stations to complete at least a subset of the purchasing transactions, or whether the frequency of assistance needed by the customer during the purchasing transactions fell below a predetermined threshold.

A third aspect of the present invention provides a program product stored on a computer readable medium for rewarding customers, the computer readable medium comprising program code for causing a computer system to: track a set of service choices made by a customer during purchasing transactions; track a frequency of assistance needed by the customer during the purchasing transactions; and offer a reward to the customer based on at least one of the following: whether the set of service choices made by the customer included a service choice to use self-checkout stations to complete at least a subset of the purchasing transactions, or whether the frequency of assistance needed by the customer during the purchasing transactions fell below a predetermined threshold.

A fourth aspect of the present invention provides a method for deploying a system for rewarding customers, comprising: providing a computer infrastructure being operable to: track a set of service choices made by a customer during purchasing transactions; track a frequency of assistance needed by the customer during the purchasing transactions; and offer a reward to the customer based on at least one of the following: whether the set of service choices made by the customer included a service choice to use self-checkout stations to complete at least a subset of the purchasing transactions, or whether the frequency of assistance needed by the customer during the purchasing transactions fell below a predetermined threshold.

A fifth aspect of the present invention provides a computer-implemented business method for rewarding customers, comprising: tracking a set of service choices made by a customer during purchasing transactions; tracking a frequency of assistance needed by the customer during the purchasing transactions; and offering a reward to the customer based on at least one of the following: whether the set of service choices made by the customer included a service choice to use self-checkout stations to complete at least a subset of the purchasing transactions, or whether the frequency of assistance needed by the customer during the purchasing transactions fell below a predetermined threshold.

A sixth aspect of the present invention provides computer software embodied in a propagated signal, the computer software comprising instructions for causing a computer system to: track a set of service choices made by a customer during purchasing transactions; track a frequency of assistance needed by the customer during the purchasing transactions; and offer a reward to the customer based on at least one of the following: whether the set of service choices made by the customer included a service choice to use self-checkout stations to complete at least a subset of the purchasing transactions, or whether the frequency of assistance needed by the customer during the purchasing transactions fell below a predetermined threshold.

A seventh aspect of the present invention provides a data processing system for rewarding customers, comprising: a memory medium having instructions; a bus coupled to the memory medium; and a processor coupled to the bus that when executing the instructions causes the data processing system to: track a set of service choices made by a customer during purchasing transactions, track a frequency of assistance needed by the customer during the purchasing transactions, and offer a reward to the customer based on at least one of the following: whether the set of service choices made by the customer included a service choice to use self-checkout stations to complete at least a subset of the purchasing transactions, or whether the frequency of assistance needed by the customer during the purchasing transactions fell below a predetermined threshold.

BRIEF DESCRIPTION OF THE DRAWINGS

These and other features of this invention will be more readily understood from the following detailed description of the various aspects of the invention taken in conjunction with the accompanying drawings in which.

Figure 1:
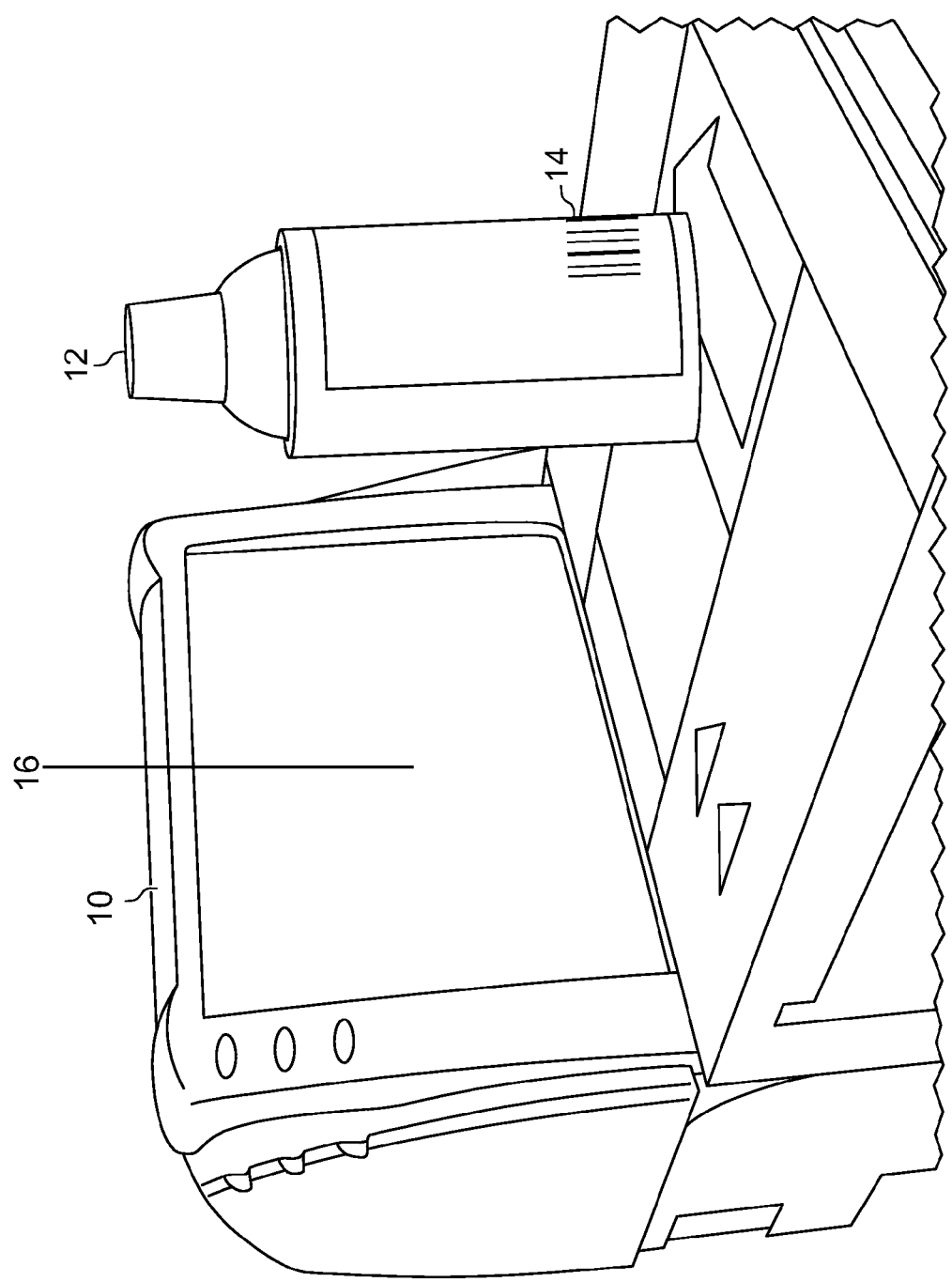
FIG. 1 depicts self-checkout station according to one embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:
I. General Description
II. Computerized Implementation
I. General Description As used herein, the following terms have the associated meanings:
"Set"—a quantity of at least one.
"Purchase Transaction"—a commercial transaction where goods and/or services are purchased, such as the purchase of a good from a retail store.

As indicated above, the present invention addresses the deficiencies in the related art by providing an approach for rewarding customers for use of self-checkout stations, and, optionally, for being self-sufficient in such use by not requiring retailer (employee) assistance. Specifically, the under the present invention, a set of service choices made by a customer during purchasing transactions are tracked. Such service choices include whether the customer elected to use self-checkout stations. In addition, a frequency of assistance needed by the customer during the purchasing transactions will be tracked. Such tracking can be accomplished using any known technology including the use of the customer loyalty cards that are assigned to specific customers. In any event, a reward can be offered to the customer if the customer elected to use self-checkout stations to complete at least a subset of the purchasing transactions, and/or if the frequency of assistance needed by the customer during the purchasing transactions fell below a predetermined threshold.

Referring now to FIG. 1, a self-checkout station 10 according to an illustrative embodiment of the present invention is shown. As depicted, item 12 is scanned by swiping a barcode 14 by barcode reader 16. Once all items have been scanned in this fashion, the customer can make payment, using known techniques such as swiping a credit card, inserting cash and/or coins into bill and/or coin acceptors, etc.

As indicated above, the present invention customer will be rewarded for using a self-checkout station 10 such as that depicted in FIG. 1 for the purchasing transactions, and/or for not requiring assistance while performing their purchasing transaction (e.g., not need a store employee's assistance). To initiate the transaction, the customer will typically first identify himself/herself to the station 10. One way to accomplish this is to have the customer present his/her loyalty card to barcode reader 16. Once identified, certain actions of the customer will be tracked. Specifically, a set service choices made by the customer during the purchase transaction will be tracked. Once such service choice is whether the customer elected to use a self-checkout station 10 (which would be considered a positive/good service choice under the present invention). This is a foregone conclusion if the customer used that station 10 of FIG. 1. However, if the customer used a non self-checkout station, such a service choice would be noted. Other service choices could be how the customer scans the barcodes 14 of the products 12 to be purchased, and how the customer makes payment. In any event, when such service choices are made, they will be logged. Thereafter, a frequency of assistance needed by the customer during the purchasing transaction will be tracked (e.g., logged). Thereafter, a reward can be offered to the customer if the set of service choices made by the customer included a service choice to use self-checkout stations 10 to complete at least a subset of their history purchase transactions; and/or if the frequency of assistance needed by the customer during the purchasing transactions fell below a predetermined threshold.

Such rewards can take the form of cash refunds, discounts on future purchases, etc. The amount of the rewards can also be variable, based on how frequently the customer used self-checkout stations 10 (e.g., a percentage of their transactions) and how infrequently the customer needed help. This is so that a customer who always uses self-checkout stations 10 and/or never requires assistance will receive a greater reward than a customer who occasionally uses self-checkout stations and/or frequently requires assistance. It should be understood that although not shown, various security measures could be incorporated within the scope of the invention. Such measures including an image capture device into the shopping and/or checkout process to verify whether an item identified based on a barcode scan is consistent with its appearance as captured by the image capture device. Such measures are more specifically shown and described in the above-incorporated patent applications.

II. Computerized Implementation

Figure 2:
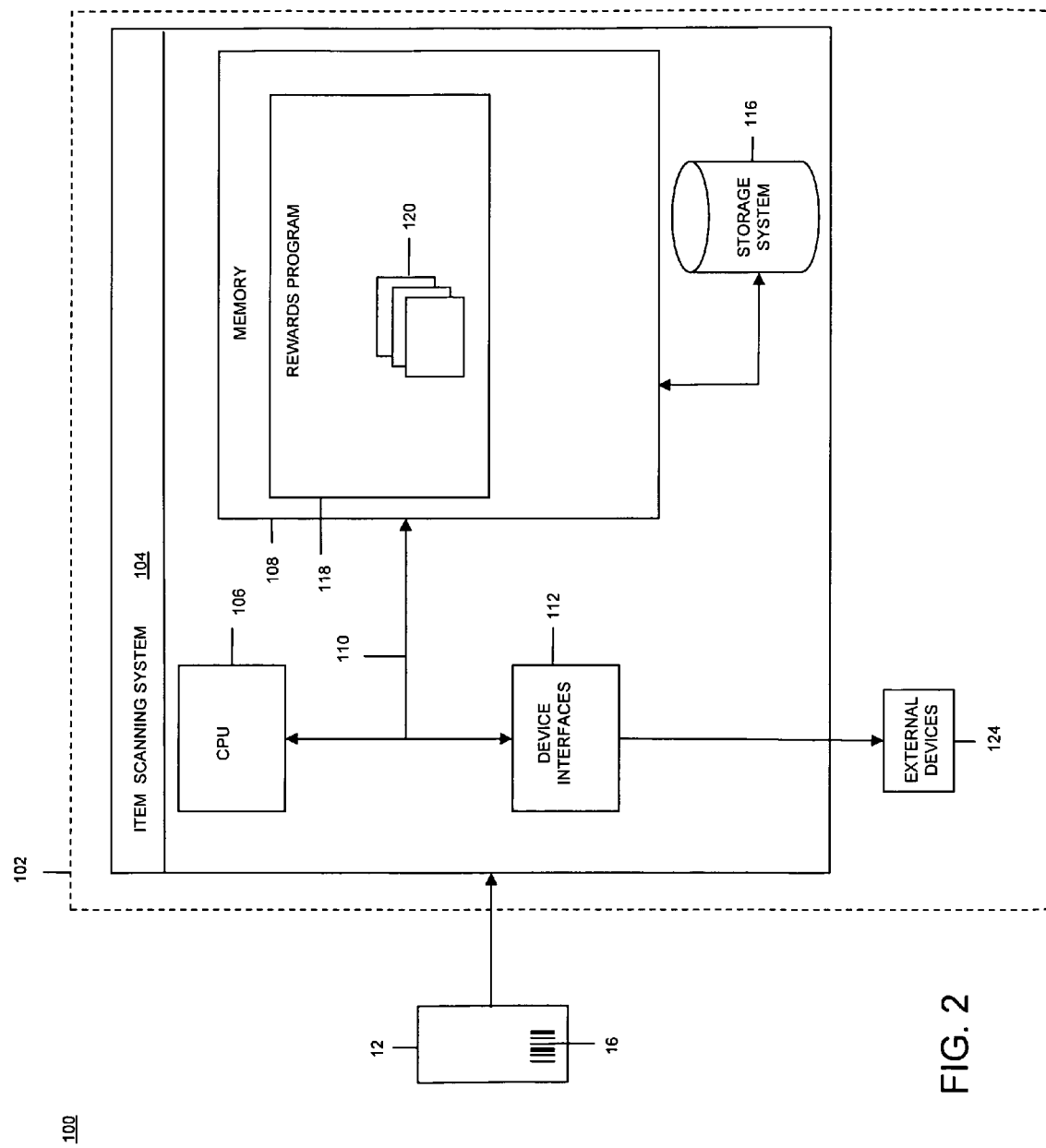
FIG. 2 a more specific computerized implementation according to the present invention.

Referring now to FIG. 2, a computerized implementation 100 of the present invention is shown. As depicted, implementation 100 includes computer system/register (e.g., item scanning system) 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system/register 104 includes a processing unit 106, a memory 108, a bus 110, and device interfaces 112. Further, computer system/register 104 is shown communicating with one or more external devices 124 that communicate with bus via device interfaces (although an image capture device alternatively could directly communicate with bus 110). In general, processing unit 106 executes computer program code, such as reward software/program 118, which is stored in memory 108 and/or storage system 116. While executing computer program code, processing unit 106 can read and/or write data to/from memory 108, storage system 116, and/or device interfaces 112. Bus 110 provides a communication link between each of the components in computer system/register 104. Although not shown, computer system/register 104 could also include I/O interfaces that communicate with: one or more external devices such as a kiosk, a checkout station, a keyboard, a pointing device, a display, etc.); one or more devices that enable a user to interact with computer system/register 104; and/or any devices (e.g., network card, modem, etc.) that enable computer system/register 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system/register 104 is only representative of various possible computer systems that can include numerous combinations of hardware. To this extent, in other embodiments, computer system/register 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 2 can be included in computer system/register 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system/register 104.

Shown in memory 108 of computer system/register 104 is reward program 118, which a set of modules 120. The modules generally provide the functions of the present invention as described herein. Specifically (among other things), set of modules 120 is configured to: identify customers; track and log (e.g., in storage system 116) a set of service choices made by a customer during purchasing transactions; track and log (e.g., in storage system 116) a frequency of assistance needed by the customer during the purchasing transactions; offer a reward (based on a predetermined algorithm) to the customer based on at least one of the following: if the set of service choices made by the customer included a service choice to use self-checkout stations to complete at least a subset of the purchase transactions, and/or if the frequency of assistance needed by the customer during the purchasing transactions fell below a predetermined threshold. Set of modules 120 are also configured to make the award variable according to any predetermined algorithm based on the above factors.

While shown and described herein as a customer reward solution, it is understood that the invention further provides various alternative embodiments. For example, in one embodiment, the invention provides a computer-readable/useable medium that includes computer program code to enable a computer infrastructure to provide customer rewards. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 2) and/or storage system 116 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide customer rewards. In this case, the service provider can create, maintain, support, etc., a computer infrastructure, such as computer infrastructure 102 (FIG. 2) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for customer rewards. In this case, a computer infrastructure, such as computer infrastructure 102 (FIG. 2), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system/register 104 (FIG. 2), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A customer reward method, comprising:
    tracking, by a computer device, a set of service choices made by a customer during purchasing transactions at least one of a plurality of checkout stations of a retail location;
    tracking, by the computer device, a frequency of assistance of an employee at the retail location needed by the customer during the purchasing transactions; and
    offering, by the computer device, a reward to the customer based on each of the following:
        whether the set of service choices made by the customer included a service choice to use a self-checkout in the plurality of checkout stations to complete at least a subset of the purchase transactions, and
        whether the frequency of assistance needed by the customer during the purchasing transactions fell below a predetermined threshold.

2. The customer reward method of claim 1, further comprising identifying the customer.

3. The customer reward method of claim 2, the identifying being based on a customer loyalty card.

4. The customer reward method of claim 1, the reward being a cash refund.

5. The customer reward method of claim 1, the reward comprising discounts to the customer.

6. The customer reward method of claim 1, the reward amount being variable, based on at least one of the set of service choices or the frequency of assistance.

7. The customer reward method of claim 1, the tracking the set of service choices comprising logging every time the customer selects a self-checkout station to complete one of the purchasing transactions.

8. The customer reward method of claim 1, the tracking the frequency of assistance comprising logging every time the customer requires assistance to complete one of the purchasing transactions.

9. A customer reward system, comprising:
    a computer device that performs a method comprising:
        tracking a set of service choices made by a customer during purchasing transactions at least one of a plurality of checkout stations of a retail location;
        tracking a frequency of assistance of an employee at the retail location needed by the customer during the purchasing transactions; and
        offering a reward to the customer based on each of the following:
            whether the set of service choices made by the customer included a service choice to use a self-checkout in the plurality of checkout stations to complete at least a subset of the purchase transactions, and
            whether the frequency of assistance needed by the customer during the purchasing transactions fell below a predetermined threshold.

10. The customer reward system of claim 9, further comprising a module for identifying the customer.

11. The customer reward system of claim 10, the module for identifying being configured to identify the customer based on a customer loyalty card.

12. The customer reward system of claim 9, the module for offering being configured to offer cash back to the customer.

13. The customer reward system of claim 9, the module for offering being configured to offer discounts to the customer.

14. The customer reward system of claim 9, the reward amount being variable based on at least one of the set of service choices or the frequency of assistance.

15. The customer reward system of claim 9, the tracking the set of service choices comprising logging every time the customer selects a self-checkout station to complete one of the purchasing transactions.

16. The customer reward system of claim 9, the tracking the frequency of assistance comprising logging every time the customer requires assistance to complete one of the purchasing transactions.

17. A non-transitory computer readable medium for rewarding customers, the computer readable medium comprising program code for causing a computer system to:
    track a set of service choices made by a customer during purchasing transactions at at least one of a plurality of checkout stations of a retail location;

track a frequency of assistance of an employee at the retail location needed by the customer during the purchasing transactions; and offer a reward to the customer based on each of the following:
- whether the set of service choices made by the customer included a service choice to use a self-checkout in the plurality of checkout stations to complete at least a subset of the purchase transactions, and
- whether the frequency of assistance needed by the customer during the purchasing transactions fell below a predetermined threshold.

18. The computer readable medium of claim 17, further comprising program code for causing the computer system to identify the customer.

19. The computer readable medium of claim 18, the customer being identified based on a customer loyalty card.

20. The computer readable medium of claim 17, the reward being cash back to the customer.

21. The computer readable medium of claim 17, the reward comprising discounts to the customer.

22. The computer readable medium of claim 17, the reward amount being variable based on at least one of the set of service choices or the frequency of assistance.

23. The computer readable medium of claim 17, further comprising program code for causing the computer system to log every time the customer selects a self-checkout station to complete one of the purchasing transactions.

24. The computer readable medium of claim 17, further comprising program code for causing the computer system to log every time the customer requires assistance to complete one of the purchasing transactions.

25. A method of deploying a system for rewarding customers, comprising:
deploying a computer infrastructure, the computer infrastructure including a computer device that operates to:
track a set of service choices made by a customer during purchase transactions at least one of a plurality of checkout stations of a retail location;
track a frequency of assistance of an employee at the retail location needed by the customer during the purchasing transactions; and
offer a reward to the customer based on each of the following:
- whether the set of service choices made by the customer included a service choice to use a self-checkout in the plurality of checkout stations to complete at least a subset of the purchasing transactions, and
- whether the frequency of assistance needed by the customer during the purchasing transactions fell below a predetermined threshold.

* * * * *